United States Patent [19]
Berg

[11] 3,821,536
[45] June 28, 1974

[54] METHOD OF DIGITALLY SQUARING THE RATIO OF TWO FREQUENCIES

[75] Inventor: Christoph Berg, Gottingen, Germany

[73] Assignee: Sartorius-Werke GmbH, Gottingen, Germany

[22] Filed: Sept. 13, 1972

[21] Appl. No.: 288,556

[30] Foreign Application Priority Data
Sept. 28, 1971  Germany............................ 2148323

[52] U.S. Cl. ......... 235/160, 235/150.3, 235/92 FQ, 324/78 D
[51] Int. Cl. .............................................. G06f 7/39
[58] Field of Search ............ 235/160, 150.3, 92 FQ, 235/92 CC, 92 CP, 92 DM, 92 MT; 324/78 D

[56] References Cited
UNITED STATES PATENTS

| | | | |
|---|---|---|---|
| 2,951,202 | 8/1960 | Gordon............................ | 324/78 D |
| 2,951,986 | 9/1960 | Gordon......................... | 235/150.3 X |
| 3,040,983 | 6/1962 | Bigelow............................ | 235/150.3 |
| 3,588,473 | 6/1971 | Meyer............................. | 235/92 FQ |
| 3,662,159 | 5/1972 | Schief............................. | 235/92 FQ |

Primary Examiner—Malcolm A. Morrison
Assistant Examiner—James F. Gottman
Attorney, Agent, or Firm—Edmund M. Jaskiewicz

[57] ABSTRACT

This invention relates to a method of digitally squaring the ratio of two frequencies as for example in the measurement of weight by a chord balance. As distinct from prior art methods utilizing three counters the present invention utilizes only two counters and includes a flip-flop and a gate circuit for additive and subtractive counting.

10 Claims, 1 Drawing Figure

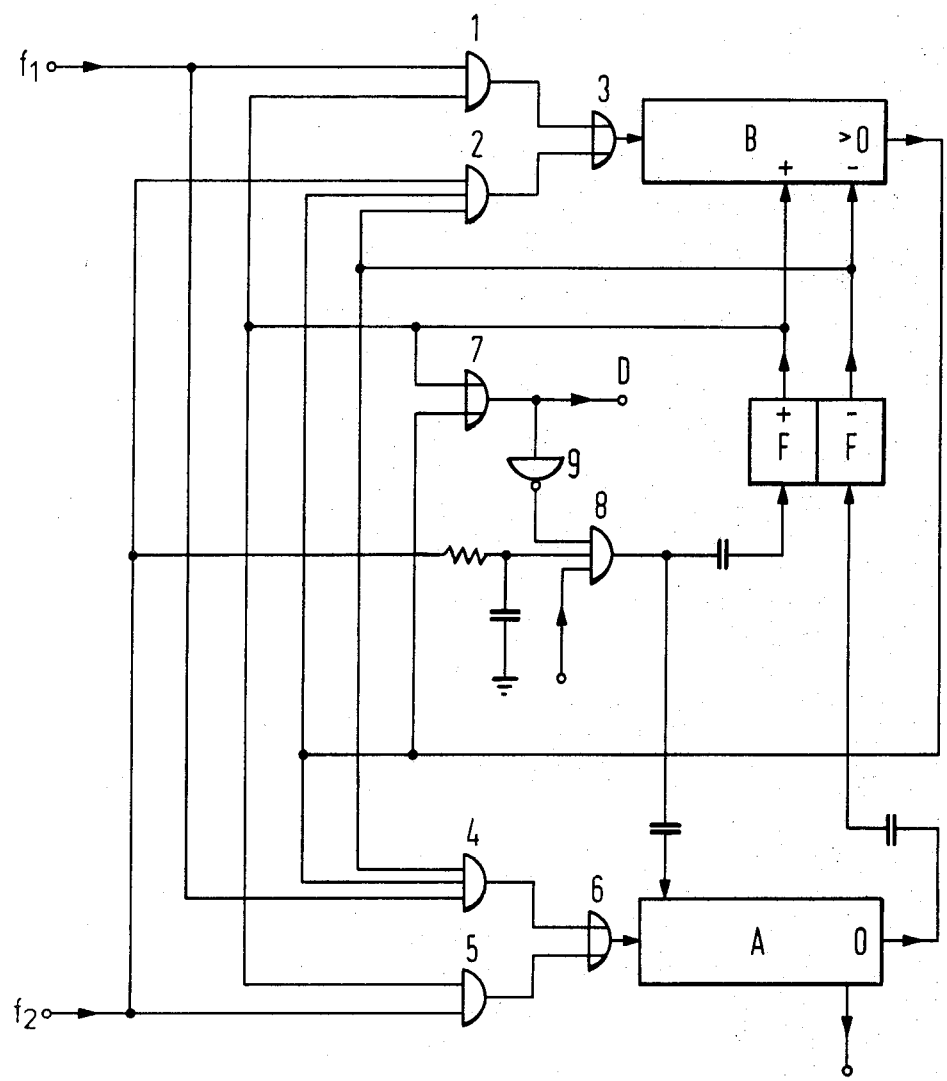

METHOD OF DIGITALLY SQUARING THE RATIO OF TWO FREQUENCIES

The present invention relates to a method of digitally squaring the ratio of two frequencies.

The requirement of squaring the ratio of two frequencies arises for example in a balance in which a chord is stressed by the combined action of a constant initial stressing force V and a weight G to be measured. The natural frequency of the cord $f_1$, is proportional to the square root of the total load:

$$f_1 = a \cdot \sqrt{V+G}$$

where $a$ is a constant.

A second chord is stressed only by the initial stressing force V so that its natural frequency is given by the equation:

$$f_2 = a \cdot \sqrt{V}$$

again where $a$ is a constant.

The weight G to be measured may then be calculated by dividing the two above equations as set out below:

$$f_1/f_2 = \sqrt{(V+G)/V},$$

from which $$G = V\,[(f_1^2/f_2^2) - 1]$$

It will be understood that the ratio $f_1^2/f_2^2$ must be determined before G, the weight to be measured, can be calculated.

Methods of digitally squaring which use three counters are known. By way of example, a first counter having forward and backward inputs, counts the difference between the frequencies $f_1$ and $f_2$ during a period $T_1$ which is determined by a second counter which counts $f_2$ up to a preset number of oscillations $N_1$.

$$T_1 = N/f_2$$

$T_1$ is followed by a time interval $T_2$ during which the reading $Z_1$ of the first counter is returned to 0 by the frequency $f_2$ $$T_2 = Z_1/f_2 = (f_1 - f_2)\,T_1/f_2$$

Finally a third counter measures the frequency $f_1$ during the time intervals $T_1$ and $T_2$ its reading $Z_3$ then indicating the total number of pulses.

Hence $$Z_3 = (T_1 + T_2) \cdot f_1$$
$$= [(N/f_2) + (f_1 - f_2)/f_2 T_1] \cdot f_1$$
$$= (f_1^2/f_2)T_1 = N \cdot (f_1^2/f_2^2)$$

Thus, three counters are required. Furthermore, the first counter has to have forward and backward inputs which can be used simultaneously. This requires heavy expenditure on circuitry, so that coincident pulses can also be correctly counted at the inputs.

An aspect of the invention is to simplify the above-mentioned procedure and in which only two counters are required.

According to the present invention there is provided a method of digitally squaring the ratio of two frequencies which comprises feeding pulses at the second frequency to a first counter for a first time period through a gate circuit with a control element switched into one stable state, feeding pulses at the first frequency to a second counter in an additive state, the first counter being such that after a preset number of pulses have been counted the counter reaches a zero setting, an output signal being arranged to switch the control element into a second stable state to terminate the first time period and to commence a second time period during which the second counter is switched to a subtractive state by the control element and receives pulses at the second frequency through the gate circuit whilst the first counter adds pulses of the first frequency for the second time period, the gate circuit being closed when a zero setting is attained on the second counter so that the digitally squared reading is obtained on the first counter.

An additional advantage of the method in accordance with the invention is that forward-backward counting is separated with respect to time.

The invention will now be described further by way of example with reference to the accompanying drawing the single FIGURE of which illustrates a circuit diagram suitable for carrying out the method of the invention.

The circuit includes two counters A and B, a gate circuit embodying six gates designated 1 to 6 and a bistable flip-flop FF which controls the gate circuit and the change-over of counter B from addition to subtraction. 1, 2, 4, 5 and 8 are AND gates, 3, 6 and 7 are OR gates and 9 is an inverter.

A starting pulse applied through AND gate 8 switches the flip-flop FF into one stable state corresponding with "addition" and sets the preset number of oscillations $-N$ in the counter A ($-N$ corresponds to $10^n - N$, $n$ being the number of decades in the counter). The Counter B is set to zero.

Counter B is switched to addition by the flip-flop FF and the gates 1 and 5 are opened, so that counter B receives pulses of frequency $f_1$ which are fed to one input and counter A receives pulses of frequency $f_2$ which are fed to the second input. After N pulses have been counted in counter A, i.e., after the period $T_0 = N/f_2$, counter A reaches a zero reading and produces a signal which switches the flip-flop FF into its other stable state corresponding with "subtraction." At this stage counter B has counted $Z_B = T_0 \cdot f_1$ pulses. When in the state corresponding with "subtraction" flip-flop FF switches counter B to subtraction, closes the gates 1 and 5 and opens the gates 2 and 4, since the counter B simultaneously produces a signal $Z_B > 0$. If $f_1$ is equal to 0, i.e. $Z_B = 0$, all the gates remain closed and the result $(f_1/f_2)^2 = 0$ can be read from the counter A. In the normal case where $f_1 \neq 0$, a new counting period $T_M$ commences during which pulses of frequency $f_2$ are subtracted from the counter reading $Z_B$ in counter B, and pulses of the frequency $f_1$ are added up commencing from 0 in the counter A. The counting period $T_M$ terminates when counter B reaches a zero reading.

Hence:

$$T_M = Z_B/f_2 = T_0 \cdot f_1/f_2 = N \cdot f_1/f_2^2$$

A result $Z_A = T_M f_1 = N(f_1/f_2)^2$ is present in the counter A and remains in counter A until the commencement of a fresh cycle. The counter B reads zero and is thus in a correct state for a following measuring operation.

A fresh cycle commences when a starting pulse sets the reading of the counter A to $-N$ and sets the flip-flop FF into a state corresponding to addition again. The result can be read from counter A between two cycles and, if required, can be further processed. A signal is present at output D during the period $T_0$ and $T_M$ and prevents a reading from being taken from the counter A by way of known circuits not illustrated in the FIGURE.

If an additional additive constant K is required for the evaluation, the counter A is set to $-N + K$ during starting and the output is switched in such a manner that a signal is supplied to flip-flop FF when the counter reading is K. The counter A is then at K at the commencement of the measuring time $T_M$ and, at the end of $T_M$, indicates:

$$Z_A = N[(f_1/f_2)]^2 + K$$

K may be positive or negative.

In the case of a chord balance, the input of this constant K can serve for the digital suppression of a tare weight.

If the measurement time is not synchronized with the pulse train, an error of $\pm 1$ counting steps occurs each time virtually uniform pulses are counted. In the described circuit, the commencement of $T_0$ is given by the starting signal, the end of $T_0$, and thus the beginning of $T_M$, is synchronized with $f_2$, and likewise the end of $T_M$. Thus, with the exception of the triggering error, $T_M$ is exactly equal to $Z_B/f_2$, while $T_0$ is determined only by $T_0 = N \pm 1/f_2$. Thus, with result $Z_B$, the error in the duration of the measuring interval $T_0$ is added to the error of $\pm 1$ counting steps as a result of the absence of synchronization of the measuring interval $T_0$ and the counting frequency $f_1$. However, this error of $T_0$ can be eliminated by the starting signal becoming effective only when an $f_2$ pulse arrives. It does not matter whether this $f_2$ pulse, which has allowed the start to become effective, is added in or not, since the number N is optionally predetermined. The only important thing is that the circuit should be designed in such a manner that it always operates in the same manner.

Referring again to the drawing, an RC coupling on the input side of the gate 8 indicates a time lag which ensures that counter A receives a starting signal after the synchronizing pulse, i.e., the counter A does not count in the synchronizing pulse. The time lag must be longer than the transmit time of the $f_2$ pulse through the gates 5 and 6, but shorter than the minimum period of the frequency $f_2$.

The method of digitally squaring the ratio of two frequencies described herein is intended to be illustrative only and it will be appreciated that variations and modifications may be resorted to without departing from the spirit and scope of the invention as set forth in the attached claims.

I claim:

1. A method of digitally squaring the ratio of two frequencies using counters comprising the steps of feeding pulses at a second frequency to a first counter whose initial reading has been set at -N for a first time period which is equal to the N-fold duration of a cycle of the second frequency to bring the reading of the first counter to zero, feeding pulses for the first time period at a first frequency to a second counter whose initial reading has been set at zero such that the reading of the second counter is increased from zero, and in a second time period which is equal to the time required to bring the reading of the second counter back to zero subtracting pulses at the second frequency from the second counter and adding pulses at the first frequency to the first counter so that the digital reading shown on the first counter upon expiration of the first and second time periods is N times the desired ratio of squared frequencies to which is added the initial reading of the first counter.

2. A method as claimed in claim 1 wherein the initial reading on the first counter is other than zero.

3. A process as claimed in claim 2 wherein said initial reading corresponds to the tare weight to be overcome on a spring balance.

4. A method as claimed in claim 1 and the step of synchronizing the beginning of the first time period with a reference frequency.

5. A method as claimed in claim 1 wherein the method is used for the measurement of weight by a spring balance.

6. A method as set forth in claim 1 which additionally comprises the step of presetting the first counter to a value including a constant K such that the first counter supplies a pulse to the control element upon attaining the preset value including the constant K, whereby the total of constant K and the measured value is available in said first counter at the end of the second time period.

7. A method as set forth in claim 6 wherein the constant K is positive.

8. A method as set forth in claim 1 wherein the comencement of said first time period is synchronized to the second frequency.

9. An apparatus for digitally squaring the ratio of two frequencies comprising first and second counters, gate circuit means for connecting said counters to sources of first and second frequencies and for connecting said counters to each other, and a bistable switching element responsive to said first counter for reversing the direction of counting of said first and second counters and for interchanging through said gate circuit means the frequency sources to said counters.

10. An apparatus as claimed in claim 9 wherein said gate circuit means comprises a gate element for blocking the resetting of the initial reading into the first counter prior to the expiration of the first and second time periods.

* * * * *